United States Patent
Ploch et al.

(10) Patent No.: US 10,933,808 B2
(45) Date of Patent: Mar. 2, 2021

(54) STEERING WHEEL SKIN DEFORMATION DISPLAY

(71) Applicant: The Board of Trustees of the Leland Stanford Junior University, Stanford, CA (US)

(72) Inventors: Christopher J. Ploch, Palo Alto, CA (US); Jung Hwa Bae, Millbrae, CA (US); Mark R. Cutkosky, Palo Alto, CA (US)

(73) Assignee: The Board of Trustees of the Leland Stanford Junior University, Stanford, CA (US)

( * ) Notice: Subject to any disclaimer, the term of this patent is extended or adjusted under 35 U.S.C. 154(b) by 0 days.

(21) Appl. No.: 16/331,561

(22) PCT Filed: Sep. 8, 2017

(86) PCT No.: PCT/US2017/050728
§ 371 (c)(1),
(2) Date: Mar. 8, 2019

(87) PCT Pub. No.: WO2018/049192
PCT Pub. Date: Mar. 15, 2018

(65) Prior Publication Data
US 2019/0210523 A1 Jul. 11, 2019

Related U.S. Application Data

(60) Provisional application No. 62/385,134, filed on Sep. 8, 2016.

(51) Int. Cl.
*B60Q 1/00* (2006.01)
*B60Q 9/00* (2006.01)
(Continued)

(52) U.S. Cl.
CPC ............ *B60Q 9/008* (2013.01); *B60R 16/027* (2013.01); *B62D 1/046* (2013.01); *B62D 1/06* (2013.01);
(Continued)

(58) Field of Classification Search
None
See application file for complete search history.

(56) References Cited

U.S. PATENT DOCUMENTS 6,065,366 A * 5/2000 Koyama .................. B62D 1/04
156/293
6,236,306 B1 5/2001 Liebelt
(Continued)

FOREIGN PATENT DOCUMENTS

DE 10216158 3/2017
GB 2426316 11/2006

OTHER PUBLICATIONS

Medeiros-Ward et al., "Bypassing the Bottleneck: The Advantage of Fingertip Shear Feedback for Navigational Cues", 2010, Human Factors and Ergonomics Society Annual Meeting.
(Continued)

*Primary Examiner* — Adolf Dsouza
(74) *Attorney, Agent, or Firm* — Lumen Patent Firm

(57) ABSTRACT

A haptic feedback device for a vehicle is provided that has a ring member disposed circumferentially on the steering wheel as the moving element. This allows the system to be used with a wide variety of driver hand positions on the steering wheel, as opposed to requiring the driver to grip the steering wheel only in specific locations. A linear actuator is used, and accommodating the difference between the linear actuator motion and the rotational motion of the ring member is done via elastic compliance in the system (as opposed to providing pivots, rotary joints etc.). Such elastic compli-
(Continued)

ance can only accommodate a limited range of angular motion (e.g., +/−1 degree), but this small range of motion has been found to be sufficient for this haptic display application.

26 Claims, 9 Drawing Sheets

(51) Int. Cl.
    *B62D 1/04* (2006.01)
    *B60R 16/027* (2006.01)
    *B62D 1/06* (2006.01)
    *B62D 15/02* (2006.01)
    *G05D 1/00* (2006.01)

(52) U.S. Cl.
    CPC ......... *B62D 15/029* (2013.01); *G05D 1/0088* (2013.01)

(56) References Cited

U.S. PATENT DOCUMENTS

| | | | |
|---|---|---|---|
| 8,994,665 B1 | 3/2015 | Provancher | |
| 9,285,878 B2 | 3/2016 | Provancher | |
| 2014/0002251 A1* | 1/2014 | Springer | G06F 3/016 340/407.1 |
| 2016/0009317 A1 | 1/2016 | Evreinov et al. | |
| 2017/0313341 A1* | 11/2017 | Hoggarth | B62D 1/06 |

OTHER PUBLICATIONS

Ploch et al. Haptic Skin Stretch on a Steering Wheel for Displaying Preview Information in Autonomous Cars. 2016 IEEE/RSJ Int. Conf. Intelligent Robots and Systems (IROS) Oct. 9-14, 2016, Daejeon, Korea pp. 60-65.

* cited by examiner

STEERING WHEEL SKIN DEFORMATION DISPLAY

CROSS-REFERENCE TO RELATED APPLICATIONS

This application is a 371 of PCT application PCT/US2017/050728 filed Sep. 8, 2017. PCT Application PCT/US2017/050728 claims the benefit of US Provisional application 62/385134 filed Sep. 8, 2016.

FIELD OF THE INVENTION

This invention relates to providing haptic feedback to a user of a vehicle.

BACKGROUND

Haptic displays are devices that provide touch stimuli to a user. Haptic displays have been considered for use in in various automotive applications. However, such work is relatively recent and much remains to be discovered in terms of how best to provide haptic feedback to a driver and how best to integrate a haptic feedback device into an automobile.

SUMMARY

This work provides a haptic feedback device for a vehicle that has a ring member disposed circumferentially on the steering wheel as the moving element. This advantageously allows the system to be used with a wide variety of driver hand positions on the steering wheel and with one or two hands, as opposed to requiring the driver to grip the steering wheel only in specific locations. An important aspect of this work is the use of a linear actuator and accommodating the difference between the linear actuator motion and the rotational motion of the ring member via elastic compliance in the system (as opposed to pivots, rotary joints etc.).

Such elastic compliance can only accommodate a limited range of angular motion (e.g., +/−1 degree), but this small range of motion has been found to be sufficient for this haptic display application. Such elimination of pivots, rotary joints etc. advantageously simplifies and improves the system.

DETAILED DESCRIPTION

Section A provides a description of general principles relating to embodiments of the invention, while section B provides a detailed description of an experimental demonstration.

A) General Principles

Figure 1A:
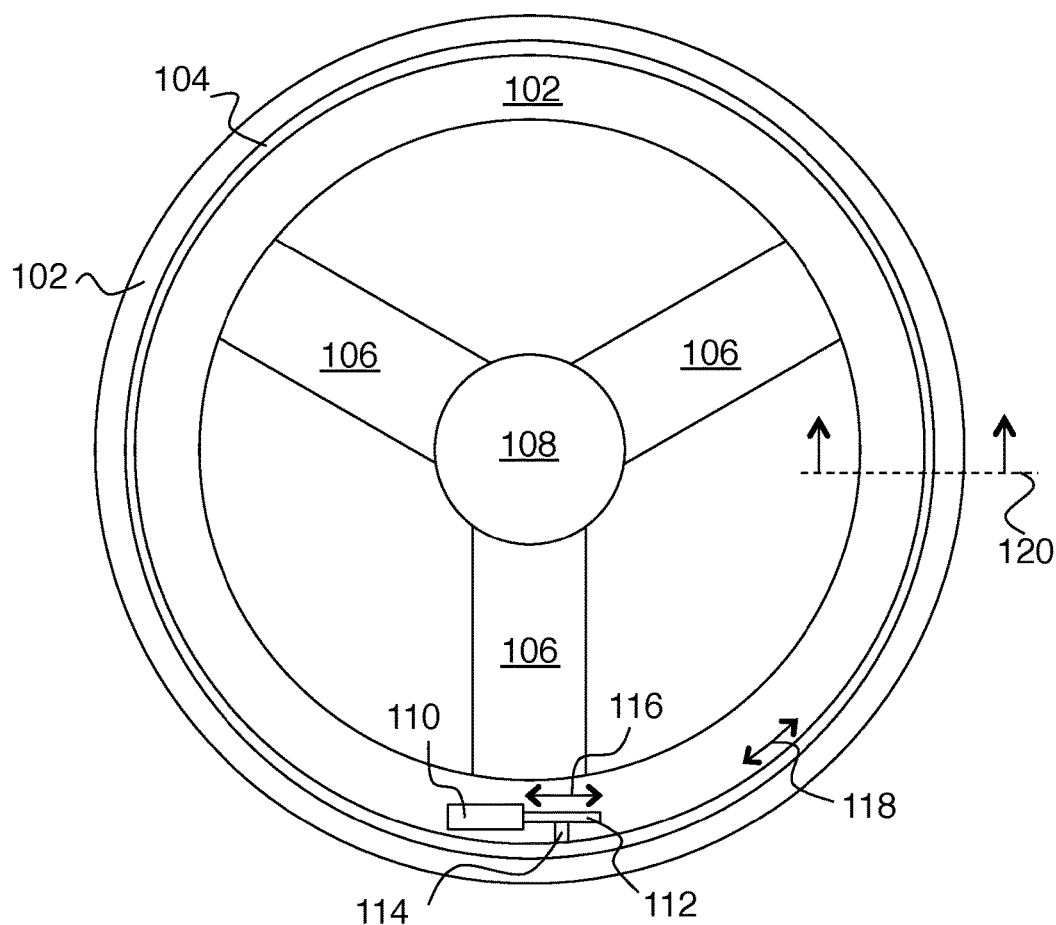
FIGS. 1A-C show embodiments of the invention.

FIG. 1A shows an exemplary embodiment of the invention. This embodiment is an apparatus for providing a haptic display for a vehicle. The feedback is based on lateral stretching of the contacting skin of the hand. This feedback is a rich analog signal, able to communicate magnitude and direction information quickly and intuitively. The apparatus includes a steering wheel 102, a ring member 104 disposed circumferentially on the steering wheel 102, a linear actuator assembly (110, 112, 114) coupled to the ring member 104 and configured to rotationally move ring member 104 with respect to steering wheel 102. More specifically, the linear actuator assembly is configured to accommodate a difference between linear motion 116 and rotational motion 118 by elastic compliance in the linear actuator assembly for an angular motion range of the ring member of +/−1.0 degrees or less. The linear actuator assembly schematically shown here includes a motor 110, a lead screw 112 and a connector 114.

Although it would ordinarily be regarded as necessary to accommodate the difference between linear motion and rotational motion with a dedicated mechanism, e.g. a set of pivot joints etc., we have found that for the range of motion needed for a haptic device of this kind such measures are not needed and undesirably make the system more complicated, as well as less mechanically precise because of extra tolerances of moving parts in a more complicated system. Instead elastic compliance within the linear actuator assembly can provide sufficient accommodation for the difference between linear and rotational motion. Such accommodation is only possible for a limited angular range of motion, as indicated above. This mechanism takes advantage of the small angle range required of the device output to remove degrees of freedom in the mechanical linkage that would seem to be required. Specifically, 2 rotational degrees of freedom (pivoting of the motor relative to the rim and pivoting of the lead screw nut relative to the display surface) are replaced by a rigid element. The amount of rotation required of these pivots for the required output range of the device are so small that they can be eliminated, and the nominally rigid element's compliance easily tolerates the discrepancy. This simplifies the design, reduces the number of parts, and increases performance by eliminating wobble of the bearings that is significant in this context. The compliant linkage in combination with the lead screw actuator achieves very uniform actuation in a compact package, with a substantial speed reduction and corresponding increase and torque.

Preferably the system is configured as an admittance haptic device that provides feedback to the user and is not significantly moved by ordinary forces the user would exert on the system in operation. The ring member can be configured to provide haptic feedback to palms, fingers and/or thumbs of a user. A front facing display stimulating the thumbs and fingers can be useful because the front of the wheel almost always has some contact with the driver's hand(s), for example when "palming the wheel" during large turns. The large, continuous ring allows a variety of gripping styles, with one or two hands. The large display surface and high torque of the feedback also has the potential to be perceived through driving gloves and other gloves of thin to medium thickness. The haptic display can be configured to provide one or more cues including but not limited to: directional pulses with or without priming, collision avoidance or safety warnings, road feel/friction cues, driver training cues, autonomous and semi-autonomous car previews, virtual walls and virtual barriers. The linear actuator assembly is preferably disposed within the steering wheel such that the shape/form factor of the steering wheel is not affected by the linear actuator assembly.

Figure 1B:
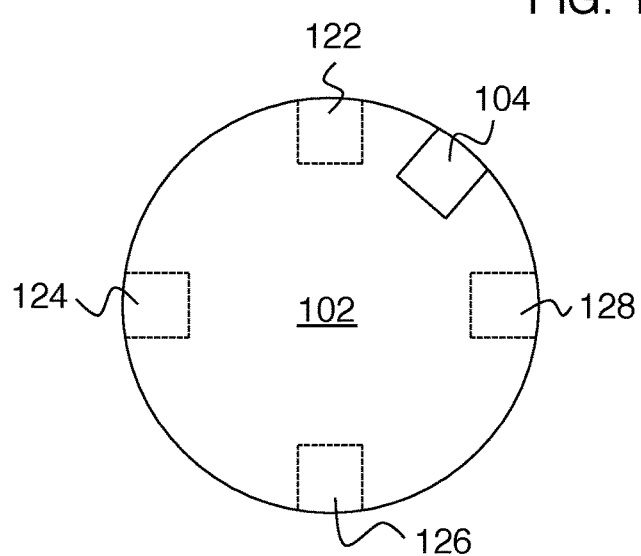
Figure 1C:
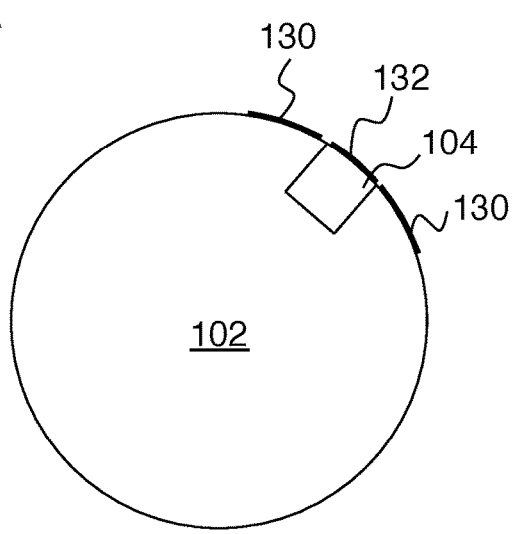

Several optional features of some embodiments are shown in the cross section views of FIGS. 1B and 1C, which are taken along line 120 of FIG. 1A and viewed in the direction shown by the arrows on line 120. FIG. 1B shows various possibilities (122, 124, 126, 128) for the location of the ring member relative to the steering wheel. For example, a front surface 122 of the steering wheel, a back surface 126 of the steering wheel, an inner circumferential surface 124 of the steering wheel and an outer circumferential surface 128 of the steering wheel. FIG. 1C shows optional coating 130 on steering wheel 102 and optional coating 132 on ring member 104 to enhance tactile feedback. These coatings can be employed separately or together. Various textures may also be used.

Figure 2:
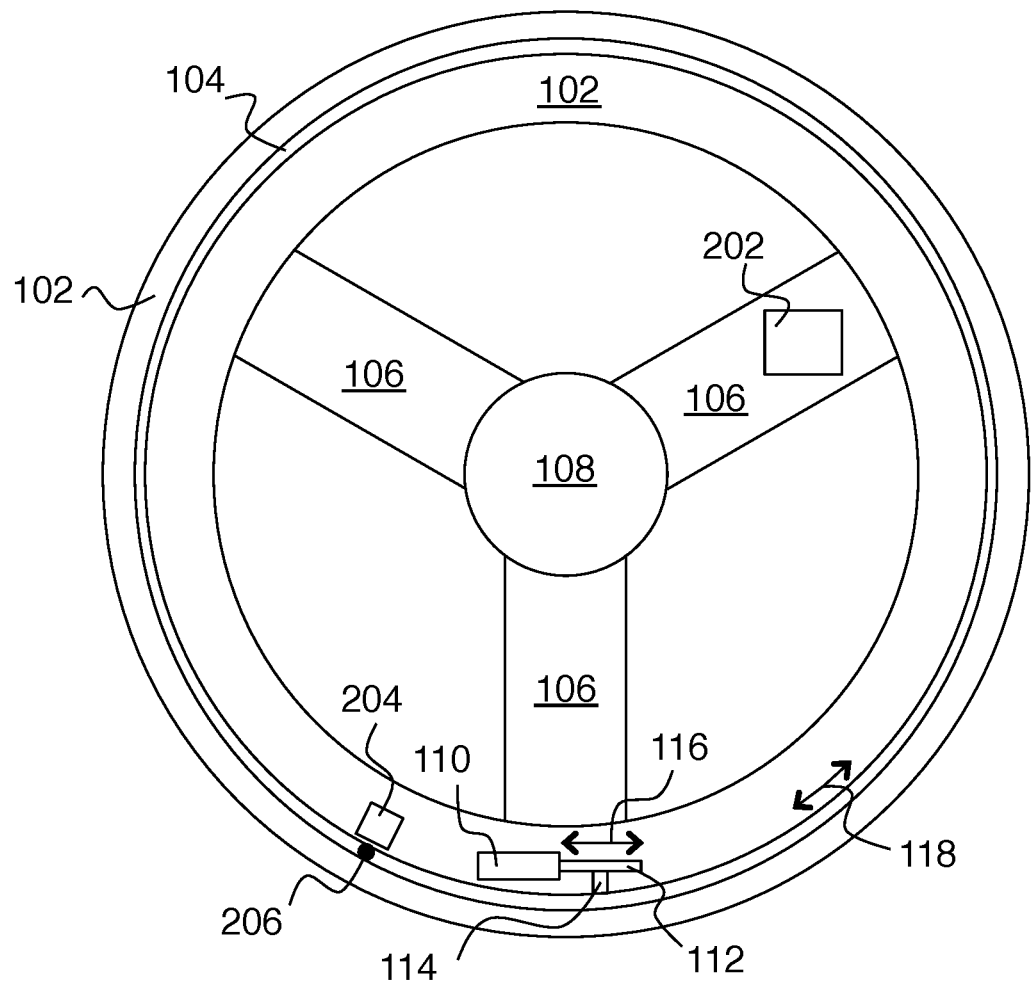
FIG. 2 shows another embodiment of the invention.

FIG. 2 shows further optional features of some embodiments. A sensor can be used to provide a direct measurement of angular position of the ring member relative to the steering wheel. For example a magnet 206 on ring member 104 can be disposed near a Hall effect sensor 204 disposed on steering wheel 102. A touch sensor 202 can be configured to determine when to actuate the linear actuator.

In preferred embodiments, the linear actuator assembly provides an output indicating its linear position (e.g., with a shaft encoder). In some embodiments, the angular position of the ring member can be determined unambiguously from the linear position of the linear actuator assembly. These embodiments can be used without a sensor for direct measurement of angular position of the ring member relative to the steering wheel. If the angular position of the ring member cannot be determined unambiguously from the linear position of the linear actuator assembly, a sensor for direct measurement of angular position of the ring member relative to the steering wheel can be used, as described above.

Section B below provides several examples of suitable linear actuator assemblies. One exemplary linear actuator assembly includes a motor having a motor shaft, a lead screw, a flexible shaft coupling connecting the motor shaft to the lead screw, and a connector member connecting the lead screw to the ring member. Another exemplary linear actuator assembly includes a motor having a motor shaft, a lead screw connected to the motor shaft, a connector member connecting the lead screw to the ring member, where the motor is affixed to the steering wheel with a motor mount having a rotational degree of freedom (e.g., the motor being mounted in a flexible mounting ring). This allows slight shifting/pivoting for shaft alignment, but is not a full pivot joint/rotational degree of freedom.

Other embodiments are possible, including a 2 degree of freedom display having a wheel with a separately actuated ring on each side of the wheel. For example, one ring could be on the front and one on the back, or one could be on the inner rim circumference and one on the outer ring circumference. This would allow more complicated feedback stimuli such as producing skin stretch on two parts of the hand in the same or opposite directions.

B) Experimental Demonstration

This section describes an experimental demonstration of a haptic device according to the above-described principles.

B1) Introduction

As modern cars incrementally gain autonomy and assume roles for which humans are traditionally responsible, it is increasingly important to keep the driver informed and in the loop. When the human does not know what actions the car is taking or why, they are likely to have increased anxiety and perform poorly if required to take control of driving again. A recent concept in human-vehicle interaction is that autonomous or semi-autonomous cars should give their drivers a preview of impending actions. For example, a semi-autonomous vehicle could warn the driver that the car intends to change lanes, make a turn, or exit a freeway, keeping the driver informed and at ease with the car's actions. A simulator study demonstrated that verbalized messages previewing a semi-autonomous car's actions have the potential to increase driving performance and decrease negative feelings. Although audio and visual cues are standard ways of giving drivers information, here we explore haptic cues for their potential advantage of gaining the driver's attention more quickly and reflexively without saturating the already heavily used visual and auditory channels.

An emerging mode of haptic feedback in automotive research is handwheel torque, e.g., for providing lane keeping information and/or collision avoidance warnings. Studies have demonstrated the efficacy of handwheel torque to communicate information, but it has the unfortunate effect of slightly steering the car and removing some of the driver's autonomy because the feedback is coupled with the steering system.

Another widely used modality in haptics, including automotive applications, is vibrotactile feedback. Navigation information has been displayed in a driving simulator using vibrotactile glasses, forward collision warnings have been provided through vibration of the steering wheel and seat belt, and multi-actuator vibrotactile steering wheels have been developed that can transmit navigation instructions. However, while this approach is compact and easy to implement, vibration feedback is best suited for binary information as it can be difficult to distinguish among multiple sources or levels of vibration. Driving tasks often relate to analog factors like direction, position, and speed, which are difficult to communicate with vibration alone.

One promising type of haptic feedback that has been effective in navigation tasks is lateral skin stretch. In lateral skin stretch feedback, a surface applies a shear force to the skin that excites a range of mechanoreceptors, including the slowly-adapting type II. It has been shown in the literature that humans can distinguish between four directions of skin stretch of the finger pad with displacements as small as 0.2 mm and speeds as slow as 1 mm/s with greater than 95% accuracy. Skin stretch has been shown to be useful in navigation tasks, and it has been demonstrated that humans are able to correctly interpret skin stretch of the thumb pads as GPS navigation cues while using a driving simulator. If properly utilized in a car, skin stretch could prove to be more informative than vibrotactile feedback while requiring fewer actuators, as well as being more pleasant to use than handwheel torque feedback because it does not steer the car for the driver. Potential applications for steering wheel skin stretch include navigation cues, collision avoidance warnings, blind spot monitoring, lane keeping, low traction warnings, driver training cues, and previews of autonomous car actions. Although skin stretch shows promise as a means of facilitating communication from car to driver, it remains untested in actual driving environments where many other sources of haptic feedback and vibrations exist that could potentially mask it. There also has not yet been a display that is integrated entirely within a conventional steering wheel and accommodates a wide range of hand positions.

The first contribution of this work is a compact skin stretch display that is embedded in a standard steering wheel and provides feedback regardless of hand positioning (e.g., as shown on FIG. 1A and described above). The display works as long as contact is made with the front of the rim; the positioning of the hands around the rim and decision to grip with one hand or two do not matter. In this example, the glabrous skin of the palms is the most likely point of contact. While generally less sensitive than the fingertips, it has a similar density of slowly-adapting type II mechanoreceptors, which have been shown to be most closely related to sensing skin stretch. Our second contribution is the demonstration in realistic on-road tests that humans can perceive the feedback and interpret direction and magnitude, even when competing against other sources of vibration as well as the distractions inherent in driving. However, stimuli must be somewhat stronger and faster than those shown to work in a laboratory environment.

B2) Haptic Device Design

In a previous skin stretch steering wheel simulator study, skin stretch was shown to be effective in providing navigation instructions, but the driver was required to use a specific grip position with the thumbs contacting the tactors. The tactors also protruded from the wheel, modifying the form factor. To improve upon this earlier work, our goals were to i) make the actuation fit inside a steering wheel rim and not significantly affect the form factor or inertia of the steering wheel, and ii) deliver skin stretch feedback for a wide variety of common grip styles that drivers use.

Figure 3A:
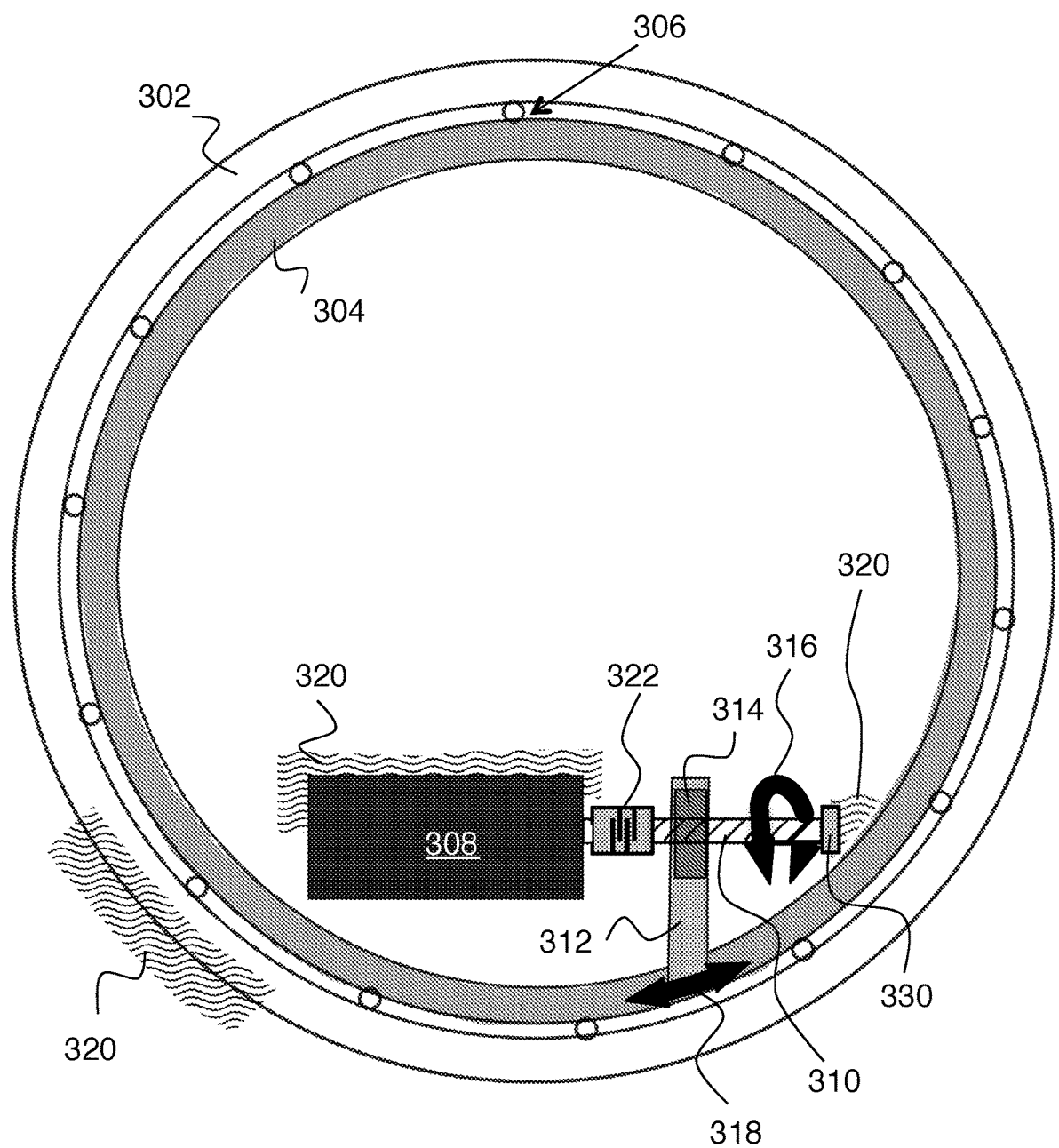
FIG. 3A shows an experimental device configuration.

1) Lateral Skin Stretch Surface:

The haptic device of this example includes an NRG 310 mm wood custom steering wheel with a large, thin-section bearing embedded into the front of the rim. A groove was cut into the rim using a CNC mill, and a small section of the rim was removed and replaced by a 3D-printed box to house the actuator. FIG. 3A shows an example of a fabricated experimental device. Here 302 is the steering wheel rim, 304 is the ring member and 306 schematically shows balls for a bearing formed by 302, 304, 306. A motor 308 with a shaft encoder drives a flexible shaft coupling 322, which drives a lead screw 310. Lead screw 310 engages with a nut 314 affixed to a connector 312 that is attached to ring member 304. As lead screw 310 rotates about its axis (as schematically shown by 316) connector 312 executes linear motion which is converted to rotational motion 318 of ring member 304. Points of rigid attachment to the steering wheel rim are schematically shown by wavy lines 320. A bearing 330 is affixed to the steering wheel rim as shown, and engages with the end of lead screw 310 opposite motor 308. Here the difference between linear motion of nut 314 and rotational motion of ring member 304 is mainly accommodated by compliance in connector 312. Flexible shaft coupling 322 is mainly meant to accommodate misalignment between motor, shaft, leadscrew, and mounting points to the rim, regardless of bearing position.

Figure 3B:
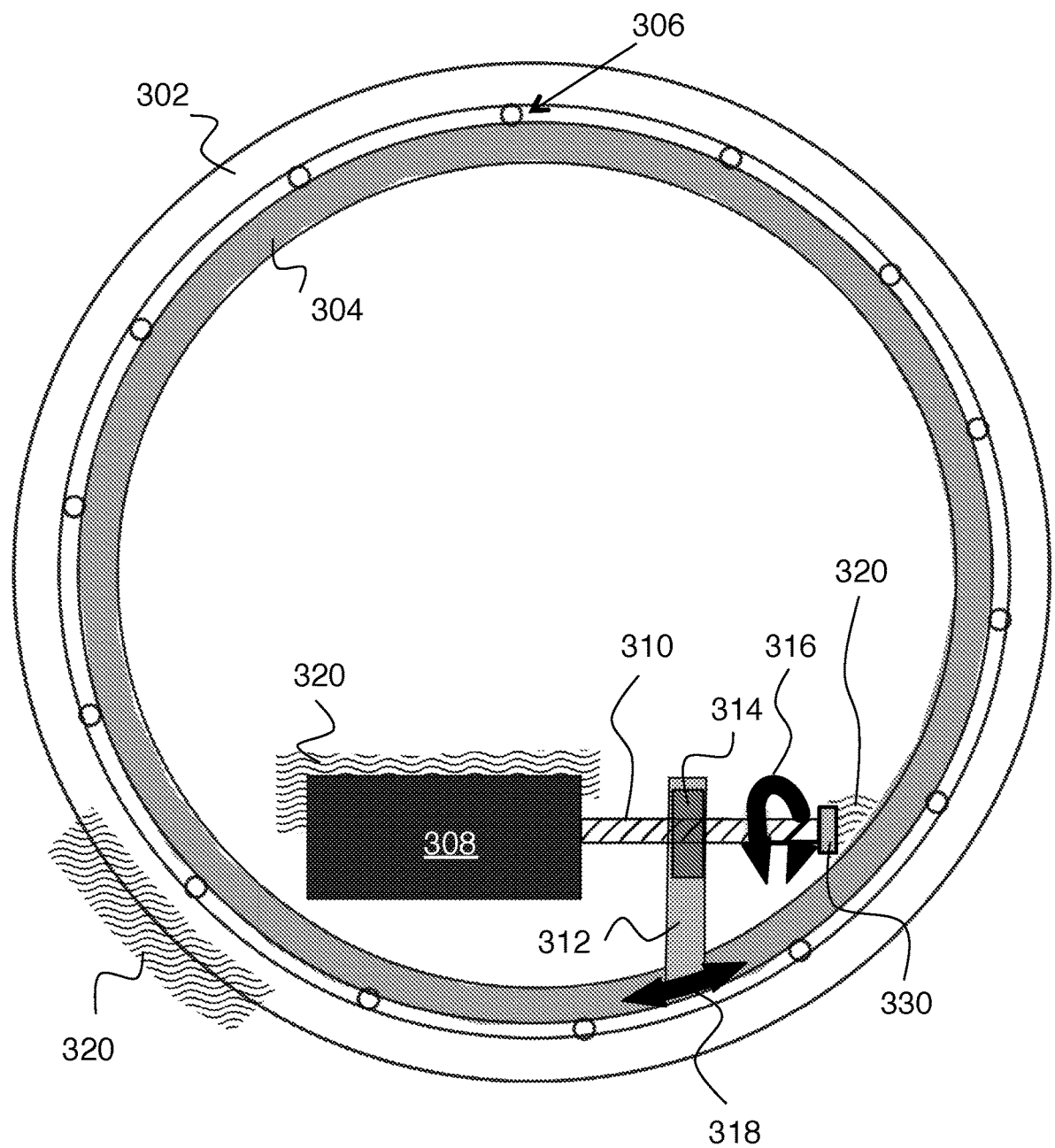
FIG. 3B shows a variant of the example of FIG. 3A.

FIG. 3B shows an example similar to the example of FIG. 3A, except that flexible shaft couple 322 is omitted. Here compliance in connector 312 accommodates the difference between linear motion of nut 314 and rotational motion of ring member 304.

Figure 4:
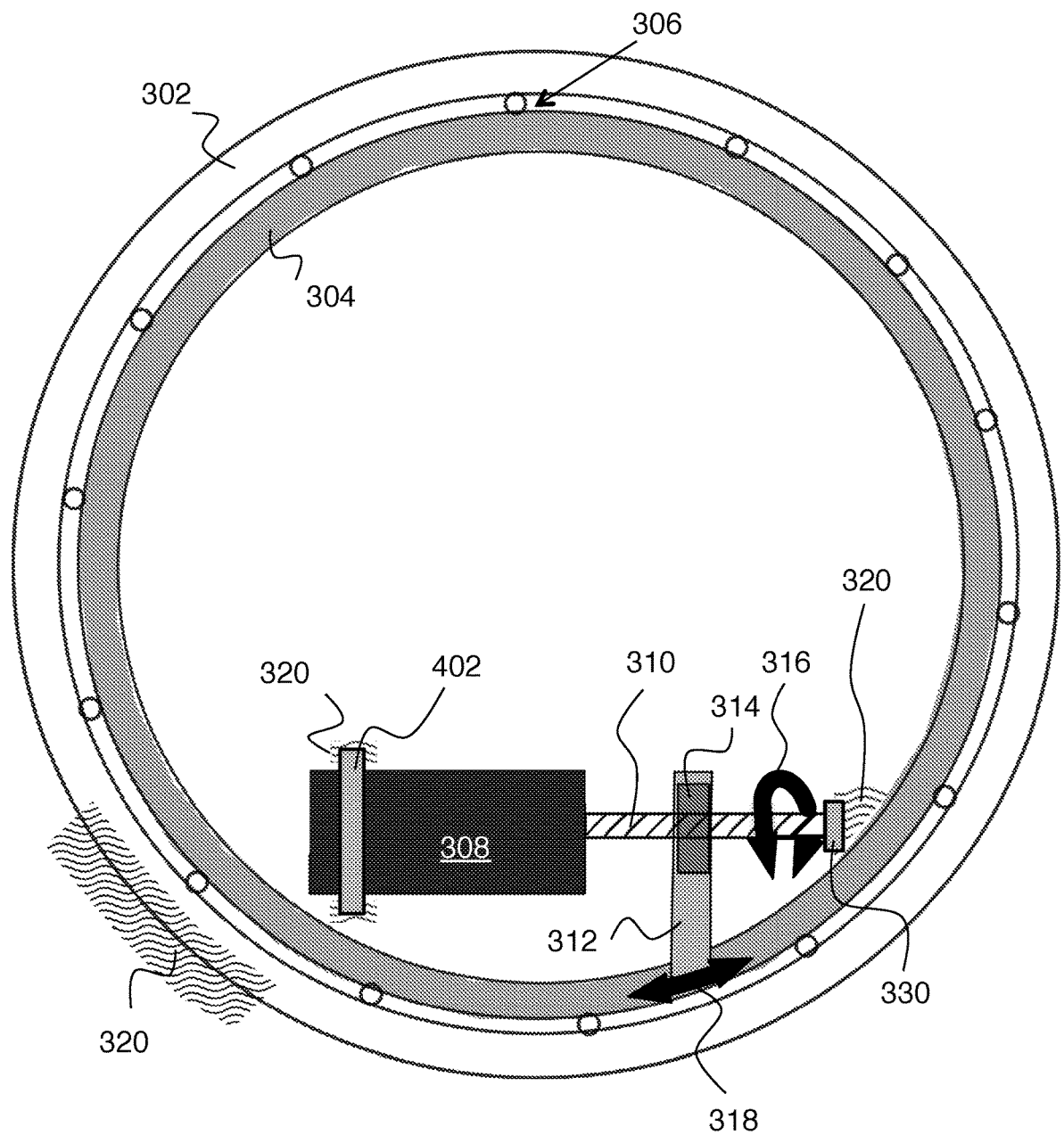
FIG. 4 shows an alternative motor mount configuration relative to FIG. 3A.

FIG. 4 shows an example similar to the example of FIG. 3B, except that a flexible mounting ring 402 is used to attach motor 308 to the steering wheel rim reference 320. Here the difference between linear motion of nut 314 and rotational motion of ring member 304 is mainly accommodated by compliance in connector 312. Flexible mounting ring 402 is intended to accommodate misalignment between motor, shaft, leadscrew, and mounting points to the rim, regardless of bearing position.

The inner ring of the bearing can rotate with respect to the wheel, and is powered by a lead screw actuator. The contact surface at the front of the ring is coated with 20 durometer silicone, chosen due to its high friction with the skin. We selected this material after a brief qualitative survey of five subjects, where each was asked to rank the materials (3M Greptile, 20 durometer Silicone, and Dycem Nonslip Reel) in terms of comfort and perceived amount of stretch.

2) Actuation:

The inner surface of the bearing is rotated up to 0.5 degrees clockwise or counterclockwise by a small lead screw actuator, corresponding to ±2.5 mm of circumferential motion of the ring, as shown in FIG. 3A. This motion creates lateral skin stretch in either direction at the palms of the user's hands. The lead screw actuator includes a Faulhaber 1224 brushed DC micromotor fixed to the wheel and connected to a 2-56 screw with a flexible shaft coupling. A small bearing fixed in the motor box supports the end of the screw opposite the motor, and a nylon nut translates along the screw, propelling the bearing through a connector. The slight misalignment resulting from converting linear to rotational motion is accommodated by compliance in the system.

The required actuation torque assumes a normal grip pressure of 4 kPA, which, based on the approximate area of the palms in contact and the friction coefficient between silicone and the human palm, leads to a required lateral force of 2.34 N. The Faulhaber 1224 motor can generate 11.5 N at stall while fitting inside the rim. The motor is controlled by a microcontroller (Teensy 3.2) and driver shield (Pololu VNH5019).

3) Sensing:

The primary sensor for the skin stretch feedback system is the motor encoder. A Hall effect sensor was added to check the feedback position, as described in the following section. A second encoder reads the angle of the steering wheel when it is mounted in a car.

B3) Haptic Device Characterization

Figure 5:
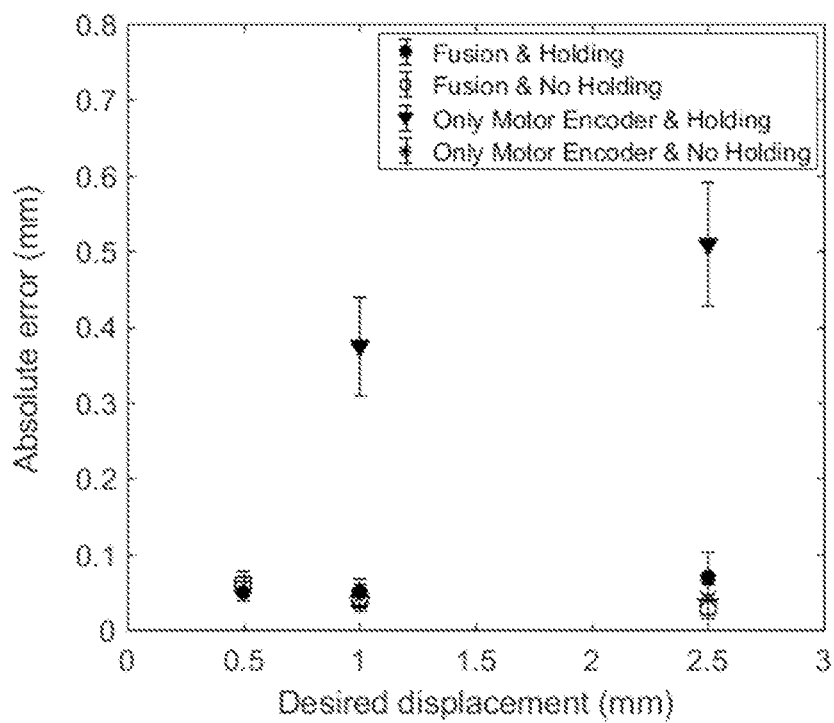
FIG. 5 shows measured position errors.

1) Position Accuracy:

The accuracy of our position control was checked by an external optical encoder. The average position error was 0.042 mm (±0.018 mm) when no grip force was applied. However, when holding the wheel with a firm grip the error increased to 0.44 mm (±0.07 mm), due to compliance in the coupling, and play in the motor shaft and the end-bearing for the lead screw. To compensate for this compliance, we have added a linear Hall effect sensor for direct position measurement of the inner ring of the bearing. With corrections made for the nonlinearity of the Hall effect sensor, the average positioning error for displacements in benchtop tests with 5 subjects was reduced from 0.44 mm to 0.06 mm (±0.02 mm) as shown on FIG. 5. Here the average of the absolute error is shown, along with 95% interval.

Figure 6:
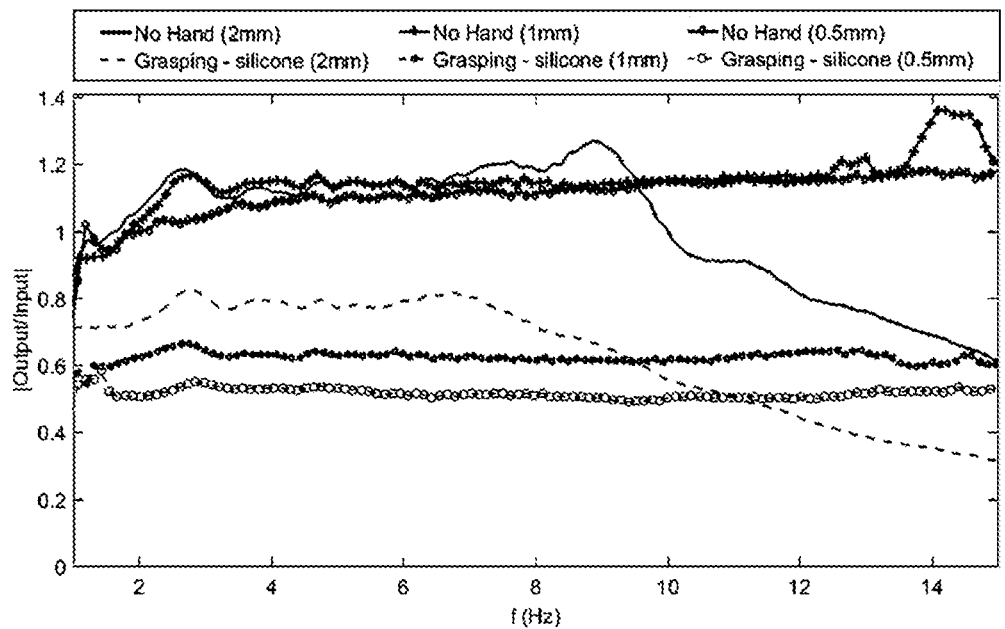
FIG. 6 shows measured system bandwidth results.

2) Bandwidth:

To evaluate the bandwidth capabilities of the display, linear chirp position signals were commanded between 1 and 15 Hz over 0.5, 1, and 2 mm displacements, with and without gripping the steering wheel with both hands. A bandwidth of up to 15 Hz was desirable. This is because at higher frequencies it becomes difficult to distinguish directional cues from non-directional vibrations due to the low spatial resolution of Pacinian corpuscles, meaning that higher frequencies could be achieved more simply with supplementary vibrotactile actuators. High frequencies may be desirable in future experiments; one idea is to supplement "road feel" by adding high frequency content. FIG. 6 shows bandwidth results obtained through empirical transfer function estimate (ETFE). The corner frequency is at least 13 Hz in all displacement cases without grasping. With grasping, the bandwidth is clearly diminished, with the maximum displacement case worsening after 7 Hz. As shown in FIG. 6, the haptic steering wheel's bandwidth approaches the desired 15 Hz for all cases without grasping. The bandwidth is somewhat diminished when gripped, but is more than sufficient for the directional cues being rendered in this study.

B4) Experiment Setup

To create a realistic test environment with significant road vibration and haptic feedback, we used a right hand drive Jeep Wrangler Unlimited. We mounted our haptic steering wheel on the left front dashboard to increase realism for the (North American) participants. An experimenter drove the car while the subject performed the experiment in the left front passenger seat. Subjects were asked to focus on the road and not on the steering wheel as much as possible, but it is a limitation of this experiment that there was no way to enforce this. Future experiments where the subject actually drives while receiving feedback will further increase the realism of the scenario. To mount the steering wheel, we used a large turntable bearing and an elastic cord that allows the subject to turn the steering wheel naturally and feel some resistance and centering torque.

Figure 7:
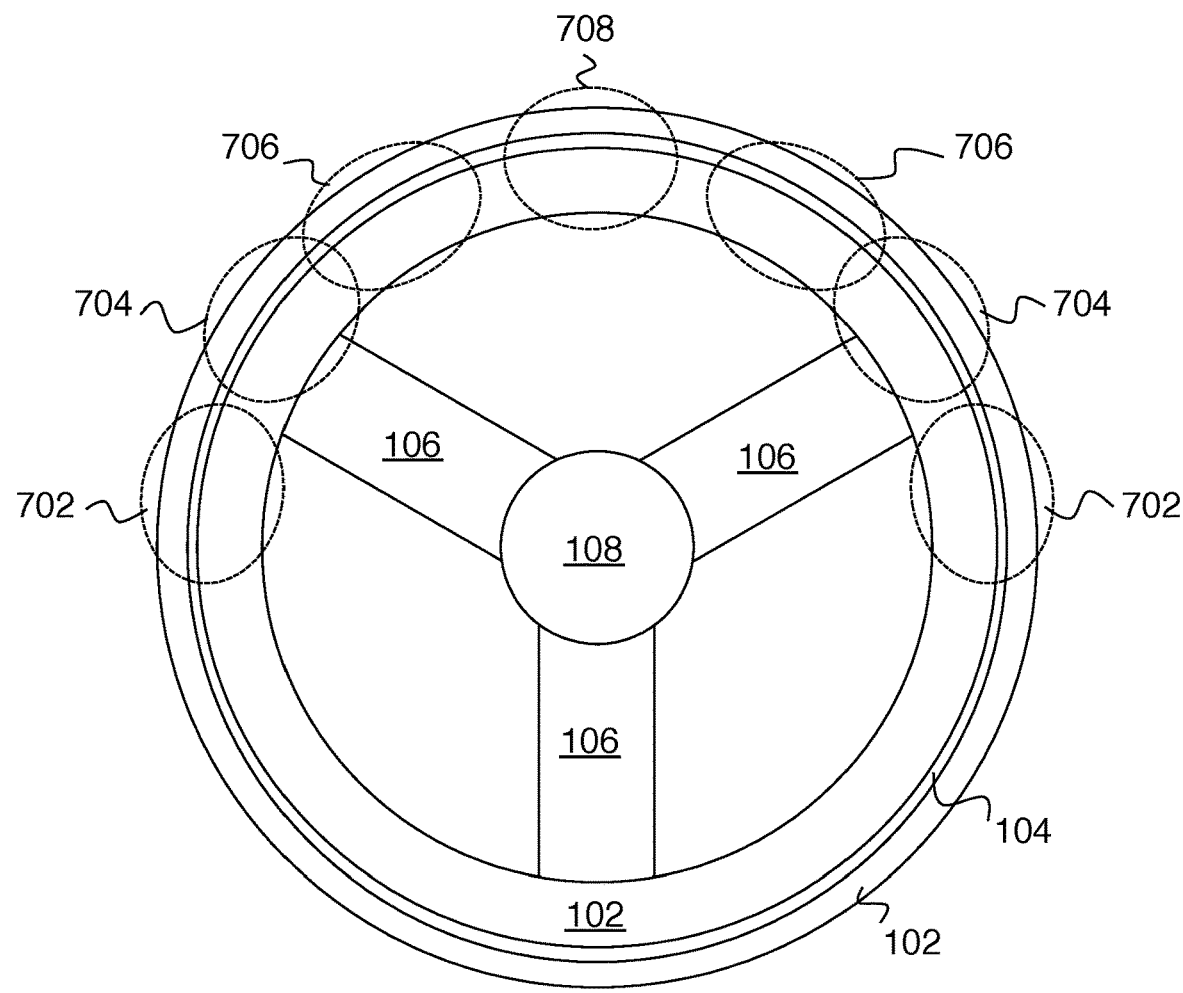
FIG. 7 shows various user grip positions on a steering wheel haptic display in an experiment.

FIG. 7 shows different steering wheel grips chosen by the users: three chose locations 702 only, five chose locations 704 only, one chose locations 706 only, and one alternated between locations 702 and location 708.

Whenever the vehicle stopped or turned, the experiment was paused and resumed afterward by the second experimenter, so that all trials were performed with the presence of road vibrations and driving distractions. To prevent subjects from receiving auditory cues from the haptic motor, they wore noise-canceling headphones during the experiment.

All experiments were run on the same route. The route was chosen for the low number of traffic lights, stop signs, and for having low speed limits (usually 35 or 40 mph, with one short section at 50 mph). Attempts were made to stay within the 35-40 mph range as much as possible, and to drive as consistently as possible in terms of speed and handling for every test subject. The road surfaces were primarily smooth concrete.

The subject population was 10 students recruited at Stanford University, composed of 3 females and 7 males, with an average age of 25.5, and average driving experience of 6 years (ranging from 0 to 12 years). Experiments took between 1 and 1.5 hours to conduct, usually including two or three laps of the primary course, and were run at different times throughout the day and evening. Users' hand positions on the wheel were noted. All tests were conducted under IRB Protocol 26526.

B5) Experiment Methods

Figure 8:
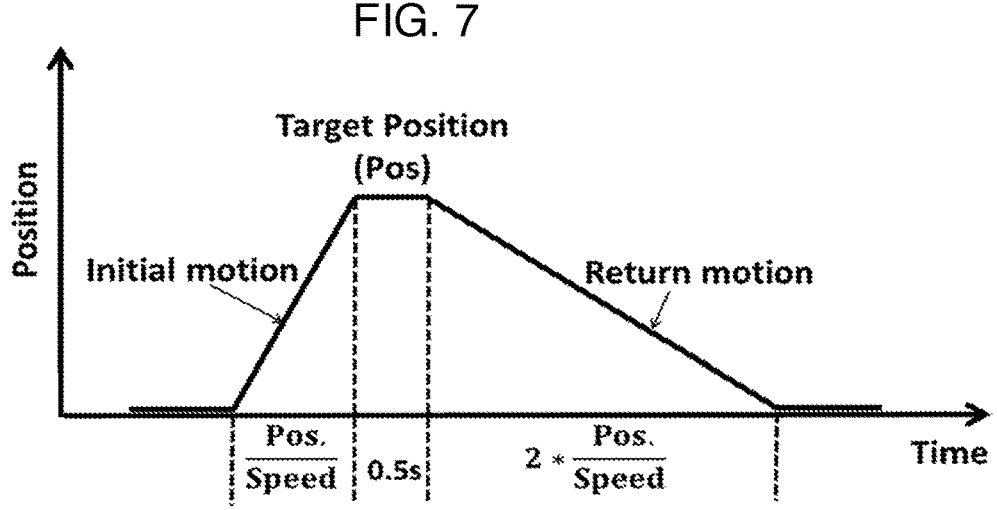
FIG. 8 shows a standard displacement vs. time curve used for experimental stimuli.

Our main experimental goals were to determine whether humans can perceive skin stretch directional stimuli in a moving vehicle and, if so, how large the magnitude and speed of the stimuli must be in comparison to the values found for skin stretch in a stationary environment. We also aimed to determine if they can reliably distinguish between a small selection of different stimuli while in the moving vehicle. This would be useful for assigning more meaning to a stimulus than direction alone. All skin stretch stimuli were standard stimulus trajectories of the form shown in FIG. 8. Here the displacement of a stimulus is the Target Position shown, and its speed is the Initial Motion shown.

1) Direction Identification Accuracy Task:

We rendered a series of stimuli of different displacements (0.5 mm, 1.0 mm, and 2.5 mm) and speeds (0.5 mm/s, 1.0 mm/s, and 4.0 mm/s), in clockwise (right) and counterclockwise (left) directions, and asked subjects to turn the steering wheel in the direction they felt, making a guess if unsure. The stimuli were chosen to roughly overlap with the higher end of those found useful in prior reports, as we hypothesized the identification task would be more difficult in a moving car. Each of the 9 possible stimulus combinations was displayed 8 times in random order for each user in both directions, giving a total of 144 stimuli per subject.

2) Absolute Threshold Test:

We also ran an absolute threshold test for displacement using the staircase method at two different speeds (1 mm/s and 2 mm/s) as a secondary way of determining how perceivable the stimuli were. In both cases, an initial stimulus of 0.5 mm was displayed to the user. If the user felt the stimulus, which was signified by turning the wheel, the next stimulus would decrease by the step size, which was set to 0.1 mm. If the user did not feel the stimulus, the next stimulus was increased by the step size. This continued until six reversals were achieved, where a reversal is a switch from an increasing next stimulus to a decreasing next stimulus, or vice versa. After six reversals, the step size was reduced to 0.04 mm, and the test was continued until a further six reversals were achieved. The 50% threshold was then defined as the average of the stimulus displacement at the reversals.

3) Task to Distinguish Between Small Selection of Stimuli:

To determine if subjects could differentiate between a small selection of stimuli, we first chose four stimuli: small displacement right, large displacement right, small displacement left, and large displacement left. The large displacements were 2.5 mm, and the small displacements were 1.0 mm. Given the results of the previous direction identification test, all stimuli were given at 4 mm/s, as we hypothesized that a high speed would make the task easier.

After a short training session, we displayed a randomized series of 40 of these stimuli, and asked participants to reply with which ones they felt while on the road. They replied by turning the wheel by a small angle and back once in the direction they felt for a small displacement and twice in the direction they felt for a large displacement.

B6) Results and Discussion

TABLE 1

Direction accuracy rate table for all trials of the 10 users, with 95% confidence intervals in parentheses.

| Displacement (mm) | Speed (mm/s) | | |
|---|---|---|---|
| | 0.5 | 1.0 | 4.0 |
| 0.5 | 0.26 (±0.119) | 0.42 (±0.118) | 0.80 (±0.093) |
| 1.0 | 0.44 (±0.134) | 0.70 (±0.095) | 0.93 (±0.054) |
| 2.5 | 0.68 (±0.109) | 0.84 (±0.078) | 0.96 (±0.032) |

1) Direction Identification Accuracy Task:

A table of accuracy rates with corresponding 95% confidence intervals (Table 1) was created to determine how successful subjects were at perceiving and identifying stimulus directions while in a moving vehicle. Although subjects were asked to always guess what direction they felt, many of the slower and smaller stimuli were imperceptible much of the time, meaning that non-responses were common. Four of the nine stimuli have accuracy rates over 80%, including the 2.5 mm and 4.0 mm/s case, which has a 96% accuracy and the 1.0 mm, 4.0 mm/s case which has a 93% accuracy, confirming that directional stimuli can be perceived in a moving vehicle with sufficient speed and displacement. However, the results are different from those found in a stationary environment, and the displacements and speeds generally need to be higher to be felt with confidence. Although prior work in the literature was able to achieve above 95% accuracy for stimuli as small as 0.2 mm and as slow as 1.0 mm/s in a stationary environment, we only found comparable accuracy in a moving car at the 2.5 mm, 4.0 mm/s case. This could result from both the driving environment as well as differences in and greater variability of skin contact.

Figure 9A:
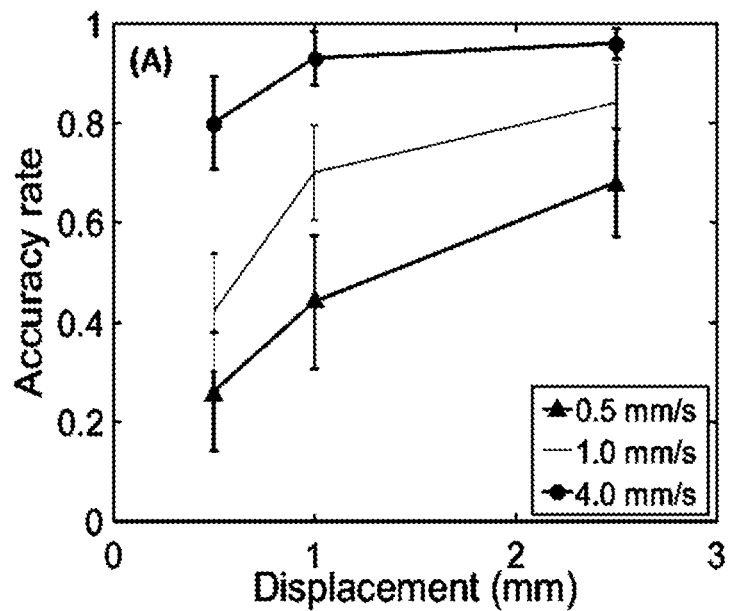
FIGS. 9A-B show experimental accuracy rates.
Figure 9B:
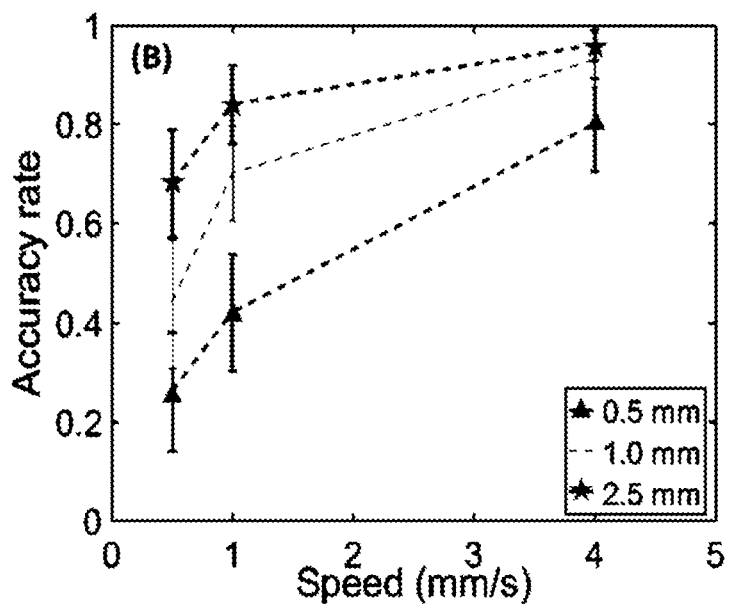

Accuracy seemed to depend heavily on speed, with accuracy for the highest speed never falling below 80%, and accuracy for the lowest speed never rising above 68%. Displacement also clearly had an effect, though not as strongly as speed. Conversely, with the lowest displacement it was still possible to reach 80% accuracy at high speed, and even with the highest displacement, the accuracy fell to 68% at low speed. These effects can be seen more easily in the accuracy rate plots in FIGS. 9A-B. Here FIG. 9A shows accuracy rate trends as a function of stimulus speed and FIG. 9B shows accuracy rate trends as a function of stimulus displacement. As with skin stretch in a stationary environment, both speed and displacement are important. However, while in that condition displacement seemed to dominate, in the driving environment it appears that speed is slightly more important.

The reasons for this result need to be explored more, but it seems likely that added vibrations and haptic feedback from the road somewhat mask the displacements, increasing the relative importance of the speed of the feedback motion. It may also be that due to the constant position perturbations felt while driving, humans are constantly taring or re-zeroing their internal perception of the position, making position feedback less clear. These results show that skin stretch displays used in automobiles must be designed to produce larger and faster directional stimuli than those used in other applications, and informs the design of skin stretch displays that will be used for future in-car experiments or commercial production.

2) Absolute Threshold Test:

The mean 50% threshold for all participants at 1 mm/s was found to be 0.44 mm, and at 2 mm/s was found to be 0.26 mm. Again, this confirms that the skin stretch is perceivable by subjects, but suggests it is more difficult than in a stationary environment, where accuracy at 1 mm/s and 0.2 mm was over 95%. These results also show the importance of speed, as doubling the speed almost halved the position threshold (p-value 0.021). It should be noted that the stimuli in this test were not manually corrected to remove error from the Hall effect sensor's nonlinear mapping like the stimuli in the other tasks were, due to the large number of stimuli that could possibly be rendered. This may have resulted in a slightly larger position error than the other tasks. It would be worth further characterizing the error in this task and removing it using a better sensor in future work.

TABLE 2

Confusion matrix, where stimulus SL corresponds with small left displacement, stimulus LL corresponds with large left displacement, stimulus SR corresponds with small right displacement, and stimulus LR corresponds with large right displacement.

| Answered | Actual | | | |
|---|---|---|---|---|
| | SL | LL | SR | LR |
| SL | 81 | 14 | 0 | 0 |
| LL | 7 | 74 | 0 | 0 |
| SR | 1 | 1 | 86 | 12 |
| LR | 1 | 1 | 3 | 78 |
| Missed | 0 | 0 | 1 | 0 |

3) Task to Distinguish Between Small Selection of Stimuli:

A confusion matrix was created to analyze how well subjects could distinguish between the four stimuli (Table 2). The majority of stimuli, 79.8%, were identified correctly by the subjects, suggesting that it is probably reasonable to teach drivers a small selection of stimuli with assigned meanings for driving tasks. Small displacements were identified with a slightly higher accuracy than large stimuli. There were only four cases of mistaken direction among all trials where subjects perceived left displacements as right displacements. Most of the confusion arose from misidentifying large stimuli as small and vice versa. This further supports the idea that displacement remains important but does not ensure successful identification in the vehicle environment as it did in the stationary environment. The large displacement used here is much bigger than the small, and likely would have been even easier to distinguish in the stationary case. Based on these results and realizing the importance of speed in the direction identification task results above, it seems likely that giving the stimuli different speeds as well as different displacements would make them easier to distinguish and produce less confusion.

B7) Conclusions and Future Work

In this section we showed that directional skin stretch cues are easily perceivable by the driver if the speed and displacement of the cue are high enough. It was found that the stimuli should be larger and faster than they would need to be in a stationary environment, and interestingly that stimulus speed was especially important in the driving environment.

Additionally, the 50% position threshold was established at different skin stretch speeds, and it was determined that humans could distinguish between a set of four stimuli of varying direction and position with reasonable accuracy. These results point to the possibility of skin stretch serving as a useful form of feedback in the car, and provide guidance as to how large and fast the stimuli should be to catch the driver's attention.

In future work it would be interesting to run experiments where the subject is able to control the car using the skin stretch steering wheel, so that its benefits can be tested in real driving tasks. Tasks related to haptic previews in autonomous cars, navigation, collision avoidance, and lane keeping are all of interest. A reasonable next step would be to run an experiment in a semi-autonomous car to determine if calmness is actually enhanced by haptic previews. Combination with other feedback modalities also would be useful to look at. One could imagine skin stretch feedback providing subtle analog cues for initial warnings followed by more intense auditory warnings if the situation becomes urgent. This type of feedback has a high potential to be useful in driving tasks because it provides rich haptic information related to magnitude and direction, it is fast and noticeable, it can render stimuli at a range of frequencies, and it does not steer the car or affect the steering dynamics. In addition, unlike sustained vibratory feedback, it does not lead to desensitization.

B8) Further Experiments

Figure 10:
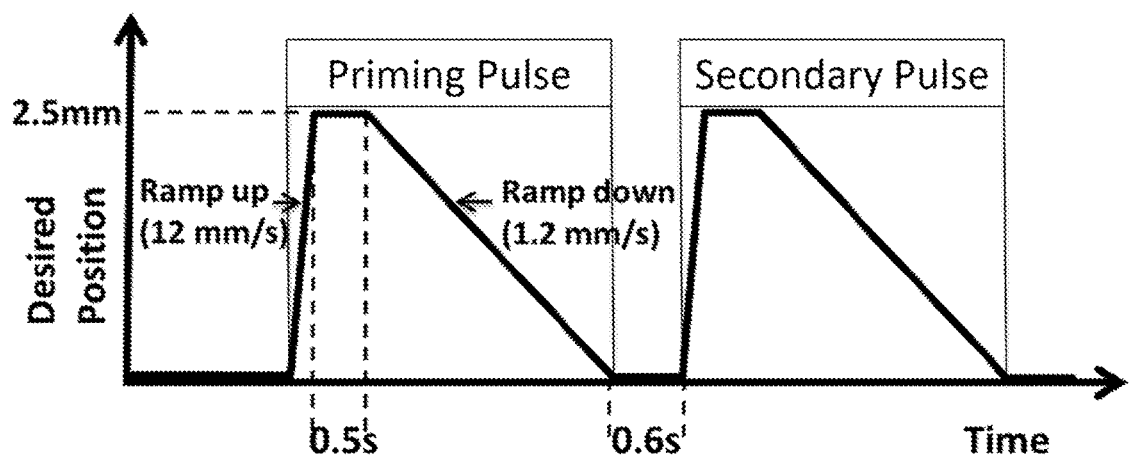
FIG. 10 shows a second standard displacement vs. time curve used for experimental stimuli.

FIG. 10 shows a double skin stretch directional stimulus including a priming pulse followed by the main or secondary pulse. This is a possible alternative to the stimulus of FIG. 8.

Figure 11:
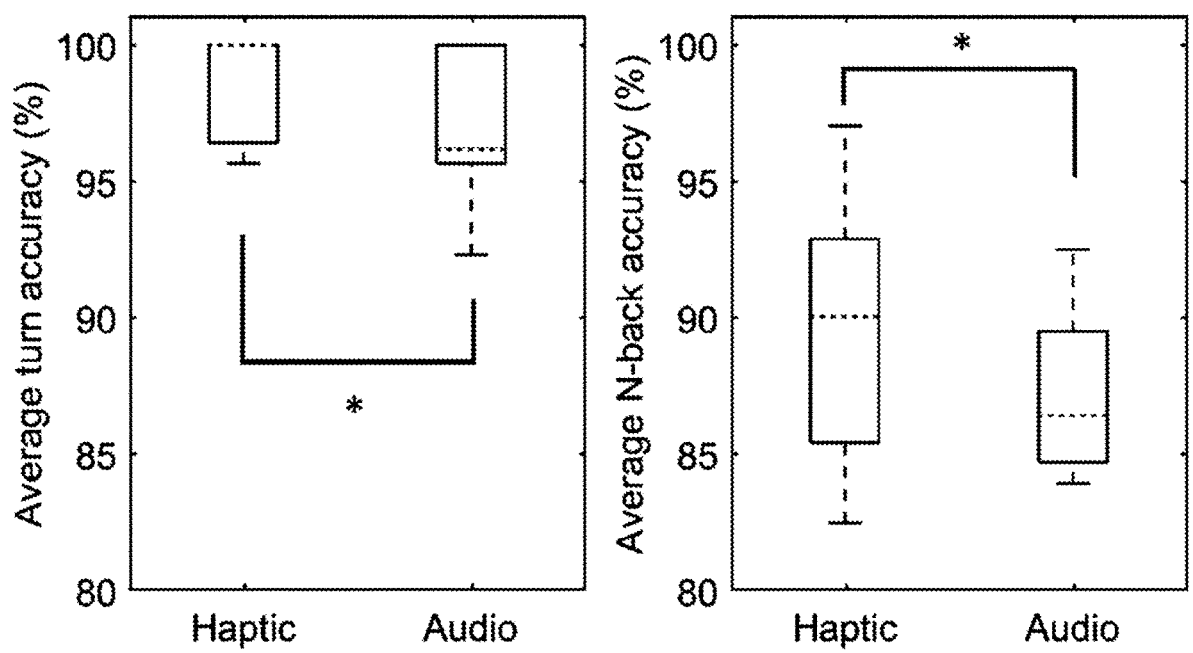
FIG. 11 shows an accuracy comparison of haptic vs. audio feedback from a second experiment.

FIG. 11 shows average turn accuracy and average N-back accuracy for skin stretch vs. audio cues in a second experiment. N-back was a secondary task performed while navigating that simulated a phone call. Boxes represent the 25th to 75th percentile of the data, the dotted line is the median, and the whiskers show the entire range. The asterisk indicates statistical significance with a 95% confidence level.

The invention claimed is:

1. Apparatus for providing haptic display for a vehicle, the apparatus comprising:
a steering wheel;
a ring member disposed circumferentially on the steering wheel;
a linear actuator assembly coupled to the ring member and configured to rotationally move the ring member with respect to the steering wheel;
wherein the linear actuator assembly is configured to accommodate a difference between linear motion and rotational motion by elastic compliance in the linear actuator assembly for an angular motion range of the ring member of +/−1.0 degrees or less;
wherein the linear actuator assembly comprises:
a motor having a motor shaft;
a lead screw;
a flexible shaft coupling connecting the motor shaft to the lead screw; and
a connector member connecting the lead screw to the ring member.

2. The apparatus of claim 1, further comprising a sensor providing a direct measurement of angular position of the ring member relative to the steering wheel.

3. The apparatus of claim 1, wherein the linear actuator assembly provides an output indicating its linear position.

4. The apparatus of claim 3, wherein an angular position of the ring member can be determined from the linear position of the linear actuator assembly.

5. The apparatus of claim 1, wherein the ring member is disposed in a location selected from the group consisting of: a front surface of the steering wheel, a back surface of the steering wheel, an inner circumferential surface of the steering wheel and an outer circumferential surface of the steering wheel.

6. The apparatus of claim 1, wherein the ring member includes a ring member surface coating or texture configured to enhance tactile feedback.

7. The apparatus of claim 1, wherein the steering wheel includes a steering wheel surface coating or texture configured to enhance tactile feedback.

8. The apparatus of claim 1, wherein the apparatus is configured as an admittance haptic device.

9. The apparatus of claim 1, wherein the ring member is configured to provide haptic feedback to palms, fingers and/or thumbs of a user.

10. The apparatus of claim 1, further comprising a touch sensor configured to determine when to actuate the linear actuator.

11. The apparatus of claim 1, wherein the haptic display is configured to provide one or more cues selected from the group consisting of: directional pulses with or without priming, collision avoidance or safety warnings, road feel/friction cues, driver training cues, autonomous and semi-autonomous car previews, virtual walls and virtual barriers.

12. The apparatus of claim 1, wherein the linear actuator assembly is disposed within the steering wheel such that a shape of the steering wheel is not affected by the linear actuator assembly.

13. The apparatus of claim 1, wherein the ring member moves with respect to the steering wheel as a rigid body.

14. Apparatus for providing haptic display for a vehicle, the apparatus comprising:
a steering wheel;
a ring member disposed circumferentially on the steering wheel;
a linear actuator assembly coupled to the ring member and configured to rotationally move the ring member with respect to the steering wheel;
wherein the linear actuator assembly is configured to accommodate a difference between linear motion and rotational motion by elastic compliance in the linear actuator assembly for an angular motion range of the ring member of +/−1.0 degrees or less;
wherein the linear actuator assembly comprises:
a motor having a motor shaft;
a lead screw connected to the motor shaft;
a connector member connecting the lead screw to the ring member;
wherein the motor is affixed to the steering wheel with a slightly flexible constraining ring allowing small amounts of position and orientation misalignment of the motor relative to the rim to be accommodated.

15. The apparatus of claim 14, further comprising a sensor providing a direct measurement of angular position of the ring member relative to the steering wheel.

16. The apparatus of claim 14, wherein the linear actuator assembly provides an output indicating its linear position.

17. The apparatus of claim 16, wherein an angular position of the ring member can be determined from the linear position of the linear actuator assembly.

18. The apparatus of claim 14, wherein the ring member is disposed in a location selected from the group consisting of: a front surface of the steering wheel, a back surface of the steering wheel, an inner circumferential surface of the steering wheel and an outer circumferential surface of the steering wheel.

19. The apparatus of claim 14, wherein the ring member includes a ring member surface coating or texture configured to enhance tactile feedback.

20. The apparatus of claim 14, wherein the steering wheel includes a steering wheel surface coating or texture configured to enhance tactile feedback.

21. The apparatus of claim 14, wherein the apparatus is configured as an admittance haptic device.

22. The apparatus of claim 14, wherein the ring member is configured to provide haptic feedback to palms, fingers and/or thumbs of a user.

23. The apparatus of claim 14, further comprising a touch sensor configured to determine when to actuate the linear actuator.

24. The apparatus of claim 14, wherein the haptic display is configured to provide one or more cues selected from the group consisting of: directional pulses with or without priming, collision avoidance or safety warnings, road feel/ friction cues, driver training cues, autonomous and semi-autonomous car previews, virtual walls and virtual barriers.

25. The apparatus of claim 14, wherein the linear actuator assembly is disposed within the steering wheel such that a shape of the steering wheel is not affected by the linear actuator assembly.

26. The apparatus of claim 14, wherein the ring member moves with respect to the steering wheel as a rigid body.

\* \* \* \* \*